US009698554B2

(12) United States Patent
Kubodera et al.

(10) Patent No.: US 9,698,554 B2
(45) Date of Patent: Jul. 4, 2017

(54) FEMALE TERMINAL FABRICATING METHOD

(71) Applicants: Yazaki Corporation, Minato-ku, Tokyo (JP); DOWA METALTECH CO., LTD., Chiyoda-ku, Tokyo (JP)

(72) Inventors: Atsushi Kubodera, Susono (JP); Hisashi Suda, Tokyo (JP)

(73) Assignees: DOWA METALTECH CO., LTD., Tokyo (JP); YAZAKI CORPORATION, Tokyo (JP)

( * ) Notice: Subject to any disclaimer, the term of this patent is extended or adjusted under 35 U.S.C. 154(b) by 113 days.

(21) Appl. No.: 14/693,990

(22) Filed: Apr. 23, 2015

(65) Prior Publication Data

US 2015/0229092 A1 Aug. 13, 2015

Related U.S. Application Data

(60) Division of application No. 13/861,743, filed on Apr. 12, 2013, now Pat. No. 9,356,412, which is a
(Continued)

(30) Foreign Application Priority Data

Oct. 14, 2010 (JP) ................................ 2010-231880

(51) Int. Cl.
*H01S 4/00* (2006.01)
*H01R 43/16* (2006.01)
(Continued)

(52) U.S. Cl.
CPC ............... *H01R 43/16* (2013.01); *C22C 9/00* (2013.01); *C22C 9/06* (2013.01); *H01R 13/03* (2013.01);
(Continued)

(58) Field of Classification Search
CPC . H01R 4/10; H01R 9/09; H01R 11/28; H01R 12/57; H01R 12/65; H01R 12/69;
(Continued)

(56) References Cited

U.S. PATENT DOCUMENTS 5,643,017 A * 7/1997 Jinno .................... H01R 43/16 439/843
5,849,424 A 12/1998 Sugawara et al.
(Continued)

FOREIGN PATENT DOCUMENTS

CN 1986857 A 6/2007
CN 101646792 A 2/2010
(Continued)

OTHER PUBLICATIONS

International Search Report (PCT/ISA/210) dated Jan. 23, 2012 issued by the International Searching Authority in counterpart International Application No. PCT/JP2011/074244.
(Continued)

*Primary Examiner* — Paul D Kim
(74) *Attorney, Agent, or Firm* — Sughrue Mion, PLLC

(57) ABSTRACT

A female terminal includes a box portion which is formed into a quadrangular prism-like shape so as for a tab of a male terminal to fit therein by bending a copper alloy plate which is obtained by being continuously and repeatedly bent before an age heat treatment is applied thereto, which has a proof stress of 700 MPa or larger and a width of 10 mm or larger and in which no crack is produced therein when bent 180 degrees about a bending axis which is at right angle to a rolling direction of the copper alloy plate. The box portion comprises notches which are formed in inner sides of bent portions produced by bending the copper alloy plate. A depth of the notch is set to be in the range from ¼ to ½ of a thickness of the copper alloy plate.

4 Claims, 5 Drawing Sheets

Related U.S. Application Data continuation of application No. PCT/JP2011/074244, filed on Oct. 14, 2011.

(51) Int. Cl.

| | |
|---|---|
| ***C22C 9/06*** | (2006.01) |
| ***H01R 13/03*** | (2006.01) |
| ***C22C 9/00*** | (2006.01) |
| *H01R 13/11* | (2006.01) |

(52) U.S. Cl.

CPC ......... *H01R 13/11* (2013.01); *Y10T 29/49204* (2015.01)

(58) Field of Classification Search

CPC ...... H01R 13/03; H01R 13/052; H01R 13/11; H01R 13/15; H01R 13/187; H01R 43/16; C22C 9/00; C22C 9/06; Y10T 29/53022; Y10T 29/53196; Y10T 29/53235; Y10T 29/5327

USPC ..... 29/592.1, 602.1, 705, 753; 439/851–853, 439/884–887

See application file for complete search history.

(56) References Cited

U.S. PATENT DOCUMENTS

| | | | | |
|---|---|---|---|---|
| 6,475,040 | B1 | 11/2002 | Myer et al. | |
| 8,070,536 | B2 * | 12/2011 | Ono | H01R 4/185 439/877 |
| 8,739,395 | B2 * | 6/2014 | Chikyu | H01R 43/0486 29/33 M |
| 2007/0148032 | A1 | 6/2007 | Aruga et al. | |
| 2010/0086435 | A1 | 4/2010 | Era | |
| 2010/0190390 | A1 | 7/2010 | Yoshida et al. | |

FOREIGN PATENT DOCUMENTS

| | | | |
|---|---|---|---|
| EP | 1050594 | A1 | 4/2000 |
| EP | 1801249 | A1 | 12/2006 |
| EP | 2184371 | A1 | 5/2010 |
| JP | 61063046 | A * | 4/1986 |
| JP | 200325019 | A | 1/2003 |
| JP | 200935775 | A | 2/2009 |
| JP | 2010129358 | A | 6/2010 |
| WO | 2009019990 | A1 | 2/2009 |

OTHER PUBLICATIONS

Written Opinion (PCT/ISA/237) dated Jan. 23, 2012 issued by the International Searching Authority in counterpart International Application No. PCT/JP2011/074244.

Japanese Office Action dated Sep. 2, 2014 issued by Japanese Patent Office in counterpart Japanese Patent Application No. 2010-231880.

Lina Zhou; "Tensile-Bending Leveller and its Problems in Application"; China Metallurgy; vol. 15 No. 5; May 2005; 3 pages total.

Office Action issued Nov. 27, 2015; by the State Intellectual Property Office of the PR China, in related Application No. 201180049780.3.

* cited by examiner

FEMALE TERMINAL FABRICATING METHOD

CROSS REFERENCE TO RELATED APPLICATION

This application is a divisional of U.S. application Ser. No. 13/861,743, filed on Apr. 12, 2013, now U.S. Pat. No. 9,356,412, which is a continuation of PCT application No. PCT/JP2011/074244, filed on Oct. 14, 2011, based on Japanese Patent Application No. 2010-231880 filed on Oct. 14, 2010, the contents of which are incorporated herein by reference.

BACKGROUND OF THE INVENTION

1. Technical Field

The present invention relates to a female terminal and a method for fabricating a female terminal.

2. Background Art

For example, when connecting together wiring harnesses in a motor vehicle, it is known that metallic male terminals and female terminals are accommodated separately in connector housings which are made of a synthetic resin so that the male and female terminals are fitted together for electric connection between both the wiring harnesses (refer to JP-A-2010-129358, for example). Demands for accommodation of more poles in a connector or demands for smaller connectors in size promote the tendency of reducing the thickness of a terminal (a metal plate) or the size of a terminal. In association with this tendency, higher strength is demanded for terminal materials. When a high-strength material is used, a working crack is formed in the material during the fabrication of a terminal, which leads to the deterioration in bendability of the high-strength material. Therefore, to cope with this problem, the bending radius is increased in general so as to suppress the deterioration in bendability of such a high-strength terminal material.

SUMMARY OF THE INVENTION

When the bending radius is increased, however, the sectional area of a female terminal is increased, this leading to a problem that the inserting performance of the female terminal into a connector housing is deteriorated or an increase in dimensions of the connector housing is called for.

The invention has been made in view of these situations, and an object thereof is to provide a small female terminal which has a superior dimensional stability after having been worked while having a high neck portion strength and a sufficiently high box portion strength and a method for fabricating the same female terminal.

With a view to solving the problem, according to a first aspect of the invention, there is provided a female terminal having a box portion which is formed into a quadrangular prism-like shape so as for a tab of a male terminal to fit therein by bending a copper alloy plate which is obtained by being continuously and repeatedly bent before an age heat treatment is applied thereto, which has a proof stress ($\sigma 0.2$) of 700 MPa or larger and a width of 10 mm or larger and in which no crack is produced therein when bent 180 degrees about a bending axis which is at right angles to a rolling direction of the copper alloy plate. In this female terminal, the box portion includes notches which are formed in inner sides of bent portions produced by bending the copper alloy plate, and a depth of the notch is set to be in the range from ¼ to ½ of a thickness of the copper alloy plate.

In the first aspect of the invention, the copper alloy plate is preferably made of a Corson series copper alloy having a work hardening exponent ranging from 0.13 or larger to less than 0.6.

In the first aspect of the invention, it is desirable that the notch has a trapezoidal section and a width of a short side of the trapezoidal section is set to be in the range from ⅓ to ⅔ of the thickness of the copper alloy plate.

According to a second aspect of the invention, there is provided a method for fabricating a female terminal comprising a first step of punching a copper alloy plate which is obtained by being continuously and repeatedly bent before an age heat treatment is applied thereto, which has a proof stress ($\sigma 0.2$) of 700 MPa or larger and a width of 10 mm or larger and in which no crack is produced therein when bent 180 degrees about a bending axis which is at right angles to a rolling direction of the copper alloy plate so as to form a blank which corresponds to a quadrangular prism-shaped box portion into which a tab of a male terminal is fitted and a second step of bending the blank into the quadrangular prism-shaped box portion. In this fabrication method, the second step has a step of forming notches in the blank before the blank is bent, and the notches are formed to a depth ranging from ¼ to ½ of a thickness of the copper alloy plate in positions corresponding to inner sides of bent portions which are formed when the blank is bent.

According to the invention, the increase in strength and formability of the female terminal can be realized by employing the copper alloy plate which is obtained by being continuously and repeatedly bent before an age heat treatment is applied thereto, which has the proof stress ($\sigma 0.2$) of 700 MPa or larger and the width of 10 mm or larger and in which no crack is produced therein when bent 180 degrees about the bending axis which is at right angles to the rolling direction of the copper alloy plate. In addition, the occurrence of a working crack can be suppressed by the notches formed in the bent portions. Further, by optimizing the depth of the notches, the occurrence of a situation can be suppressed in which a swelling is produced on an outer circumference of the bent portion in association with the bending of the blank or the strength of the female terminal becomes insufficient due to a reduction in thickness of the copper alloy plate at the bent portion. By adopting this configuration, the female terminal can be provided which is small in size and is superior in dimension stability after bending while having a high neck portion strength and a sufficiently high box portion strength.

DESCRIPTION OF EMBODIMENTS

Figure 1:
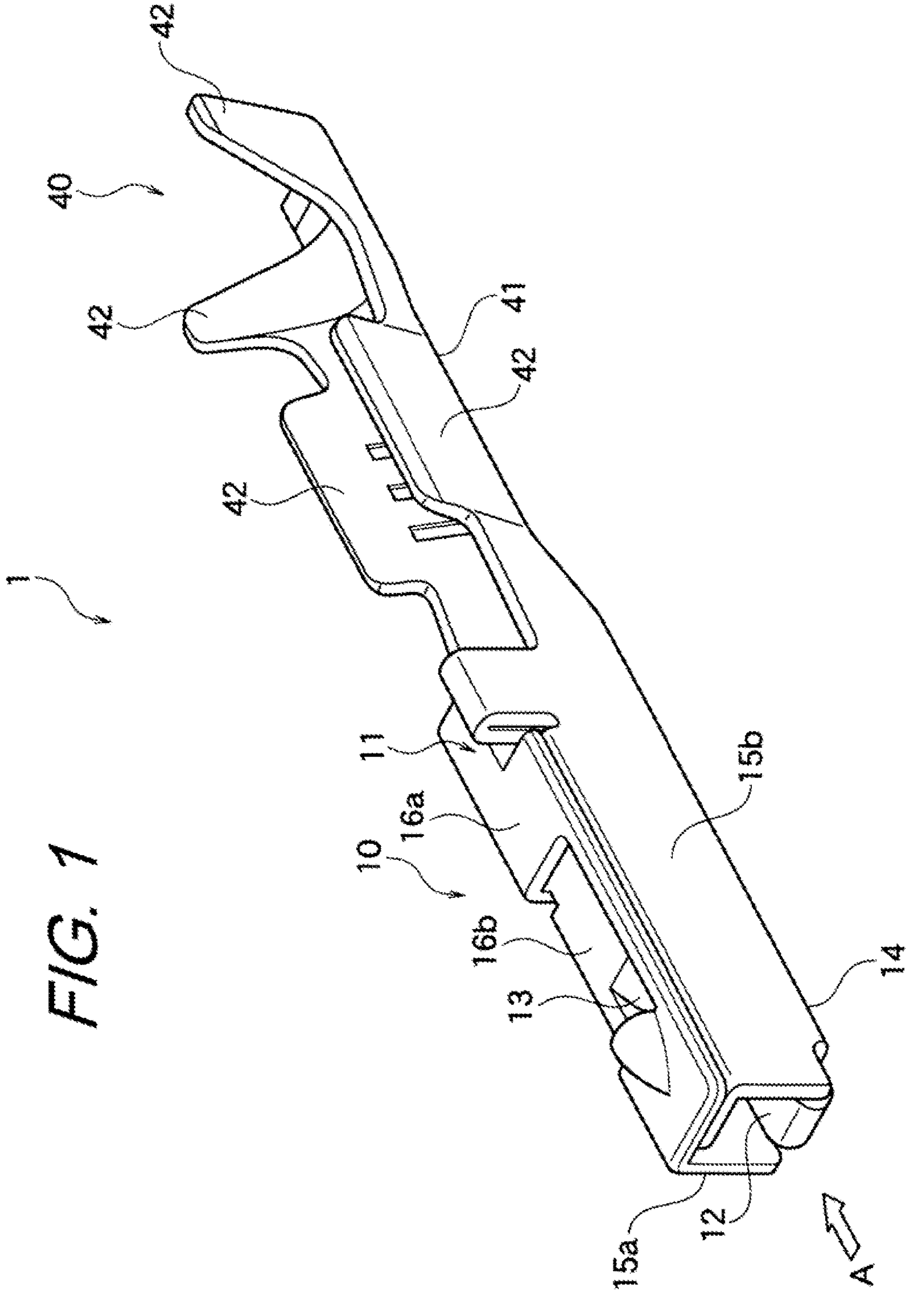
FIG. 1 is a perspective view showing exemplarily a female terminal 1.
Figure 2:
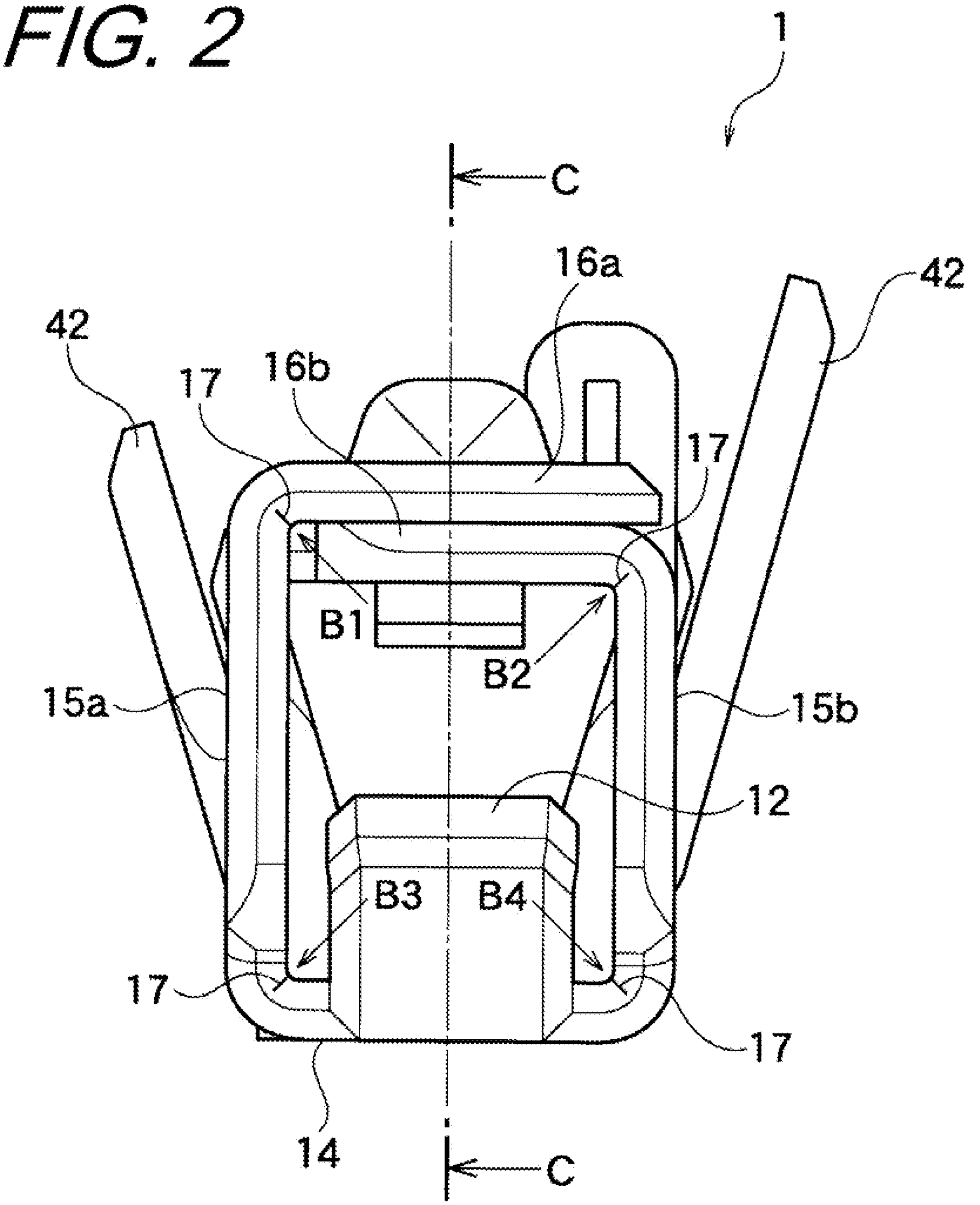
FIG. 2 is a front view of the female terminal 1 as viewed from a direction indicated by an arrow A in FIG. 1.
Figure 3:
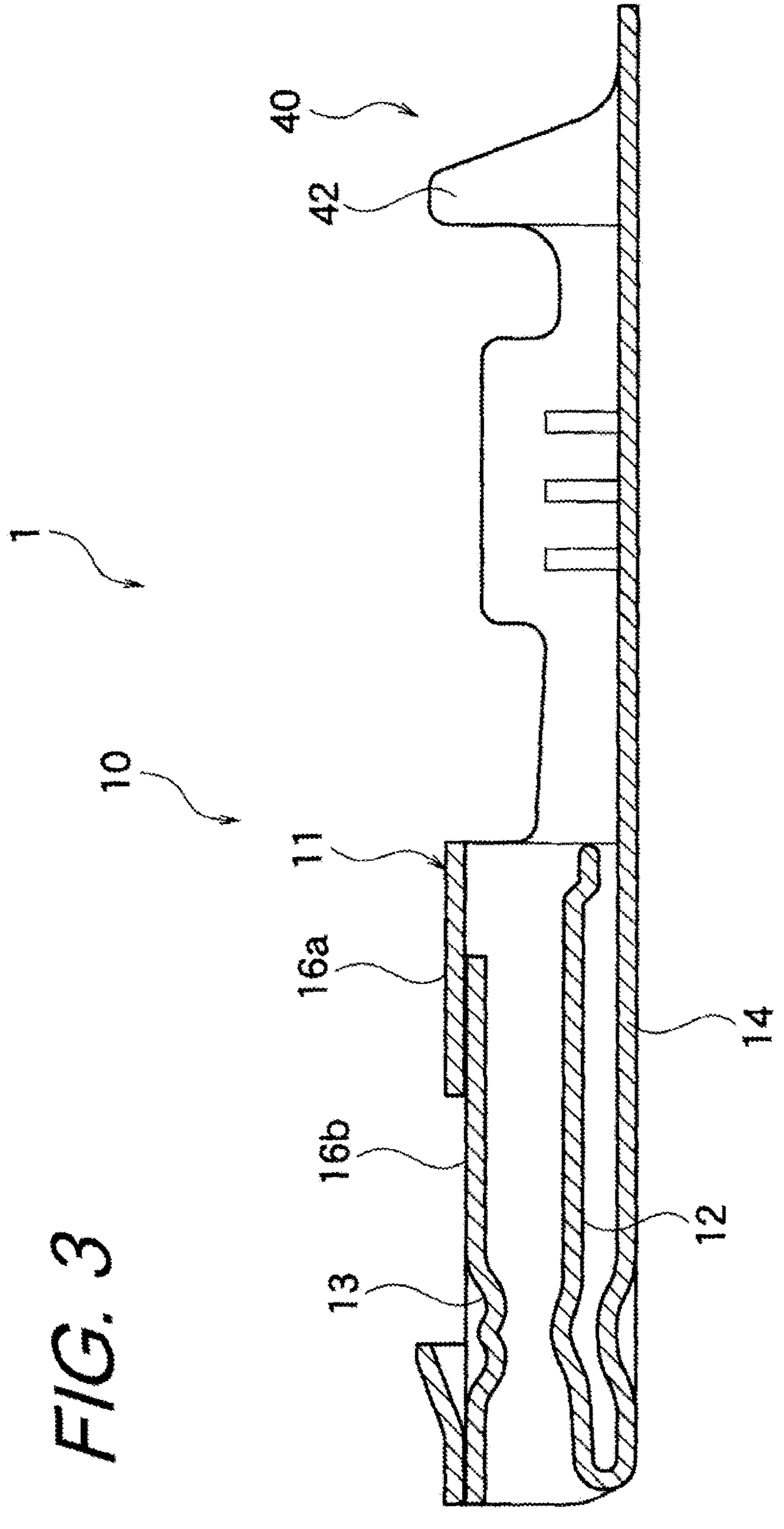
FIG. 3 is a sectional view of the female terminal 1 taken along the line C-C in FIG. 2.

FIG. 1 is a perspective view which shows exemplarily a female terminal 1 according to an embodiment of the invention. In addition, FIG. 2 is a front view of the female terminal 1 as viewed from a direction indicated by an arrow A in FIG. 1, and FIG. 3 is a sectional view of the female terminal 1 taken along the line C-C in FIG. 2. The female terminal 1 according to this embodiment is accommodated in a housing of a connector, not shown, for electrical connection with a male terminal which is accommodated in a housing of a mating connector by fitting the connector and the mating connector together. This female terminal 1 is suitable for use as small female terminals or female terminals 1 adapted to be connected with male terminals with tabs of a width (a tab width) of not larger than 0.64 mm which act as electric contact portions with the female terminals 1.

The female terminal 1 is formed by pressing a piece of conductive metal plate (a copper alloy plate). The female terminal 1 has an electric contact portion 10 and an electric wire connecting portion 40, and the electric contact portion 10 and the electric wire connecting portion 40 are formed integrally with each other.

The electric contact portion 10 includes integrally a box portion 11, an elastic piece 12 and a contact portion 13.

The box portion 11 is formed into a quadrangular prism-like shape and has a bottom wall 14, a pair of side walls 15*a*, 15*b* and a pair of upper walls 16*a*, 16*b*. A tab of a male terminal is inserted along the direction indicated by the arrow A from an opening at one end portion of the box portion 11 which is situated far away from the electric wire connecting portion 40.

The bottom wall 14, the pair of side walls 15*a*, 15*b* and the pair of upper walls 16*a*, 16*b* are individually formed into a belt-like shape. Here, the bottom wall 14 continuously extends from a bottom plate portion 41, which will be described later, of the electric wire connecting portion 40, so that the bottom wall 14 and the bottom plate portion 41 forms substantially the same flat plane. The pair of side walls 15*a*, 15*b* are individually continuous with edge portions of long sides of the bottom wall 14, so as to form wall surfaces which are at right angles to the bottom wall 14. The pair of upper walls 16*a*, 16*b* are individually continuous with edge portions of the other long sides (edge portions of long sides which are situated opposite to the bottom wall 14) of the pair of side walls 15*a*, 15*b* so as to form wall surfaces which are at right angles to the side walls 15*a*, 15*b*. In addition, the pair of upper walls 16*a*, 16*b* are disposed so as to be superposed on each other, so that one upper wall 16*b* which is continuous with one side wall 15*b* is disposed inside the box portion 11, while the other upper wall 16*a* which is continuous with the other side wall 15*a* is disposed outside the box portion 11.

The elastic piece 12 is continuous with a front of the bottom wall 14 (specifically speaking, one end portion of the bottom wall 14 which lies opposite to or far away from the electric wire connecting portion 40). The elastic piece 12 is accommodated in an interior of the box portion 11 in such a state that the elastic piece 12 is folded back to extend to the rear (towards the electric wire connecting portion 40). The elastic piece 12 has a belt-like shape, and a tab of a male terminal which is inserted into the box portion 11 is brought into contact with the elastic piece 12.

The contact portion 13 is formed by shearing out part of the upper wall 16*b* of the box portion 11 so as to project inwards of the box portion 11 as a projection. The contact portion 13 biases a tab of a male terminal that is inserted into the box portion 11 towards the elastic piece 12 so as to hold the tab between the elastic piece 12 and itself.

The electric wire connecting portion 40 connects to the electric contact portion 10. As is shown in FIG. 1 or the like, the electric wire connecting portion 40 includes the bottom plate portion 41 which connects to the electric contact portion 10 and a plurality of clamping portions 42 which connect to the bottom plate portion 41. The bottom plate portion 41 is formed into a belt-like shape. An end portion of an electric wire where a core wire is exposed is placed on an upper side of the bottom plate portion 41.

The plurality of clamping portions 42 are provided along longitudinal edges of the bottom plate portion 41. Each clamping portion 42 is bent in a direction in which the clamping portion 42 approaches the bottom plate portion 41 so as to hold an electric wire between the bottom plate portion 41 and itself in a clamping fashion. When an electric wire is clamped by the clamping portions 42, the electric wire is mounted in the electric wire connecting portion 40, whereby the male terminal and the electric wire are electrically connected.

As one of characteristics of the female terminal 1 which is configured in the way described above, in this embodiment, a working heat treatment condition in producing conditions under which a material is produced is particularly devised so as to use a copper alloy in which strength and formability are increased. Specifically speaking, a copper alloy preferably has a proof stress (σ0.2) of 700 MPa or larger as a material strength thereof for use for small terminals of a tab width of 0.64 mm or smaller. On the other hand, although the proof stress of a copper alloy used is 700 MPa or larger, in the event that the material strength is too high, there are fears that the workability of the copper alloy is deteriorated. Then, an upper limit of the material strength is preferably set to such a strength that no crack is produced when a copper alloy plate of a width of 10 mm or larger is bent 180 degrees about a bending axis which is at right angles to a direction in which the copper alloy plate is rolled.

The copper alloy in which strength and formability are increased in the way described above is obtained by bending continuously and repeatedly a Cu—Ni—Si series (a so-called Corson series) copper alloy before an age heat treatment is applied thereto. Specifically speaking, as a production method of a copper alloy plate material like the one described above, a production method is preferably adopted which includes a step of melting a Corson series alloy with a predetermined composition (for example, C70250, C64745, C64725 when denoted in CDA numbers) so as to cast it into a mold to prepare an ingot of copper alloy, a step of hot rolling the ingot material and causing it to go through cold rolling and annealing at least once, a step of cold rolling the material 15 to 50%, a step of continuously and repeatedly bending the material so as to obtain a rate of elongation of 0.1 to 1.5% while applying thereto a tension corresponding to 30 to 70% of a proof stress (σ0.2) in MPa of the material, and a step of age treating the material at a temperature ranging from 420 to 520° C., for example. The production method includes further a step of applying a final cold rolling of 30% or smaller to the material which has been age treated and a step of heat treating the material at a temperature ranging from 250 to 550° C.

The continuous and repeated bending operation is such as to apply alternately strain to a surface layer portion on each side of the material while passing the elongated plate material through relevant equipment, and this can be realized by passing the elongated plate material through a tension leveler, for example. The tension leveler is equipment that is used to correct the shape of an elongated metallic material or to uniformly distribute residual stress. In the tension roller, a repeated bending deformation is applied to tension rollers which are disposed alternately on both sides of the elongated material while applying a tension thereto.

The method in which the copper plate material is continuously and repeatedly bent before age precipitation is particularly effective for Corson series alloys. However, the same technique can also be applied to other copper alloys which make use of strengthened precipitation. By realizing a metallic structure in which the amount of precipitates is small in both surface layer portions but is large in a central portion in a thickness direction of a copper alloy plate, that is, a specific metallic structure in which a difference in the amount of precipitates is provided between both the surface layer portions and the central portion by bending continuously and repeatedly the copper alloy plate material before age precipitation in the way described above, contradicting requirements can be satisfied which are a requirement for the high proof stress (σ0.2) of as high as 700 MPa and a requirement for the good bendability which produces no crack even when the copper alloy plate is bent 180 degrees.

In addition, with a small terminal, product dimensions become small, and therefore, the bending of a box portion 11 constitutes a problem. In bending the box portion 11, although an outer side of the box portion 11 is tensioned, an inner side of the box portion 11 is compressed, facilitating the occurrence of a working crack. Although it is considered that a bending radius is set to a large value in order to suppress the occurrence of such a working crack, this approach leads to a problem that external dimensions of the terminal become large.

As an approach to solution of these problems from the viewpoint of material, there is a method for micronizing crystal grains of a terminal material. However, when micronizing crystal grains of 5 μm or smaller, there is caused a problem that an electric current carrying property is deteriorated after a long-term endurance due to a stress relaxation phenomenon. In addition, when micronizing crystal grains of 60 μm or larger, there is caused a problem that orange peels are produced in outer circumferential portions of bent portions of the box portion 11, deteriorating the quality of a product terminal.

In addition, when the box portion 11 is bent by use of this method, a sectional area of the box portion 11 is increased due to the swelling of the outer circumferential portions of the bent portions of the box portion 11. Because of this, the insertion of the terminal into the connector housing is deteriorated, leading to a problem that the quality of the terminal as a commercial product is deteriorated. With high-strength materials represented by Corson series copper alloys, deterioration in bendability becomes conspicuous particularly at a right-angle corner portion due to a spring back when pressing is carried out.

Then, in this embodiment, as has been described above, the Corson series copper alloy is used which is superior in bendability, and notches 17 are provided in inner sides of bent portions B1 to B4 of the box portion 11 of the terminal. Specifically speaking, as is shown in FIG. 2, a notch 17 is provided so as to be aligned into a line along a direction in which the bent portion B1 extends (a lengthwise direction of the terminal (the direction in which the tab is inserted)) in the bent portion B1 which is formed by the outer upper wall 16*a* of the box portion 11 and the side wall 15*a* which connects thereto. As with the bent portion B1, notches 17 are provided individually in the remaining bent portions B2 to B4 so as to be aligned into a line along the direction in which the bent portions B2 to B4 extend. Here, the bent portion B2 is formed by the inner upper wall 16*b* of the box portion 11 and the side wall 15*b* which connects thereto. The bent portion B3 is formed by the side wall 15*a* and the bottom wall 14. The bent portion B4 is formed by the side wall 15*b* and the bottom wall 14. The notches 17 will be described in detail later.

In order to ensure the product performance of the female terminal 1, it is preferable that a copper alloy plate to be worked is highly strong and the strength of the copper alloy plate is increased after it has been worked due to work hardening. In a material in which a stress σ can be approximated in a plastic region by the following expression, it is preferable that a metallic plate material (a Corson series copper alloy) which is to be worked into a female terminal 1 has a work hardening exponent n which ranges from not less than 0.13 to less than 0.6.

$$\sigma = C \cdot \epsilon^n \quad \text{[Expression 1]}$$

where, ϵ denotes strain and C is a constant which is determined in an elastic region.

When the work hardening exponent n is less than 0.13, the increase in strength of the copper alloy plate after the same plate has been worked is so small that the strength of the resulting terminal cannot be ensured. On the contrary, when the work hardening exponent n is equal to or larger than 0.6, the increase in strength becomes excessive when the notches 17 are formed, and this leads to a problem that a crack is produced when the copper alloy plate is bent.

Hereinafter, an optimum condition for the notch 17 which is formed in each of the bent portions B1 to B4 will be studied. A table below shows the results of experiments in which notches 17 were formed in a predetermined Corson series copper alloy plate (a Cu alloy plate containing 1.6 wt % Ni, 0.4 wt % Si, 0.6 wt % Sn and 0.4 wt % Zn which was continuously and repeatedly bent with a tension leveler before an age heat treatment was applied thereto, which had a proof stress (σ0.2) of 710 MPa and a width of 10 mm or larger, in which no crack was produced when bent 180 degrees about a bending axis which was at right angles to a rolling direction thereof and which had a work hardening exponent n=0.13) under various conditions (in relation to the depth and width of the notch 17) before the same copper alloy plate was bent and the Corson series alloy plate was bent through 90 degrees. Here, thickness of the cupper alloy plate is 0.15 mm. When the copper alloy plate was bent continuously and repeatedly, an entrance side tension of the tension leveler was controlled to be 50% of the proof stress (σ0.2) of the copper alloy plate, and an entrance side rolling reduction and an exit side rolling reduction of the tension leveler were controlled to be such a value that the shape of the copper alloy plate could be maintained properly. The "depth" of the notch 17 means a dimension of the notch 17 in a thickness direction of the copper alloy plate, and the "width" of the notch 17 means a dimension of a short side of a notch (a bottom portion of a notch) which was formed so as to have a trapezoidal sectional shape in a section which was at right angles to the bending axes of the bent portions B1 to B4.

TABLE 1

| Notch Depth | Notch Width | | | | |
|---|---|---|---|---|---|
| | Plate Thickness × 1/10 | Plate Thickness × 1/3 | Plate Thickness × 1/2 | Plate Thickness × 2/3 | Plate Thickness × 4/5 |
| Plate Thickness × 1/5 | ○ | ○ | ○ | ○ | ○ |
| Plate Thickness × 1/4 | ○ | ○ | ○ | ○ | ○ |
| Plate Thickness × 1/3 | ○ | ○ | ○ | ○ | ○ |
| Plate Thickness × 1/2 | X | ○ | ○ | ○ | ○ |

Here, in Table 1, "○" denotes that no crack was produced in the bent portions B1 to B4, and "x" denotes that a crack was produced in the bent portions B1 to B4. It is seen from the results of the experiments shown in Table 1 that even when the high-strength copper alloy described above is used, a crack is made difficult to be produced in the bent portions B1 to B4 by forming the notches 17 in the relevant portions.

Next, referring to the results of the experiments shown in Table 1, optimum conditions for the depth and width of the notch 17 will be studied further.

Firstly, the depth of the notch 17 will be studied. When the depth of the notch 17 is small, swellings are easy to be produced on the outer circumferences of the bent portions B1 to B4 as the copper alloy plate is bent. Because of this, the advantage in providing the notch 17 is reduced, and there is little point in providing the notch 17. This results in the fact that the dimension stability after bending is disturbed. Then, a lower limit value of the depth of the notch 17 was determined based on the judgment on the deterioration in dimensional accuracy which is represented by deterioration in easiness in insertion of a resulting terminal into a connector housing which is made by those skilled in the art to which the invention pertains in consideration of the swellings on the outer circumferences of the bent portions B1 to B4 when they observed the outer circumferences of the bent portions B1 to B4. Swellings of the outer circumferences of the bent portions are observed by visual inspection. Based on this judgment criterion, the lower limit value of the depth of the notch 17 was set to ¼ of the thickness of the copper alloy plate. On the other hand, when the depth of the notch 17 is large, the thickness of the copper alloy plate at the bent portions B1 to B4 is reduced, and therefore, there may be caused a situation in which the strength of the copper alloy plate thereat becomes insufficient even in consideration of work hardening occurring in association with the bending of the copper alloy plate. In consideration of this point, an upper limit value of the depth of the notch 17 was set to ½ of the thickness of the copper alloy plate. Thus, when taking these facts generally into consideration, the depth of the notch 17 is preferably set to be in the range of ¼ to ½ of the thickness of the copper alloy plate.

Next, the width of the notch 17 will be studied. When the width of the notch 17 is small, the notch 17 becomes narrow, leading to a problem that it is difficult to bend the copper alloy plate. Then, a lower limit value of the width of the notch 17 was set to ⅓ of the thickness of the copper alloy plate. On the other hand, when the width of the notch 17 is large, it is considered that after the copper alloy plate is bent through 90 degrees a gap is produced in an inner side of each of the bent portions B1 to B4, reducing the strength of the box portion 1. Then, an upper limit value of the width of the notch 17 was set to ⅔ of the thickness of the copper alloy plate. Thus, when taking these facts generally into consideration, the width of the notch 17 is desirably set to be in the range of ⅓ to ⅔ of the thickness of the copper alloy plate. Besides, considering that the copper alloy plate is bent after the notch 17 is formed, the width of the notch 17 is preferably set to ½ of the thickness of the copper alloy plate.

Hereinafter, referring to FIGS. 4A to 5B, a fabrication method of the female terminal 1 according to the embodiment will be described. Firstly, in a first step, a Corson series copper alloy plate is punched, so as to form necessary openings and recess portions (refer to FIG. 4A). As has been described above, the Corson series copper alloy plate provided for use in the first step meets the following conditions; (1) the copper alloy plate is obtained by being continuously and repeatedly bent before an age heat treatment is applied thereto and has a proof stress (σ0.2) of 700 MPa or larger and a width of 10 mm or larger, and no crack is produced therein even when the copper alloy plate is bent 180 degrees about a bending axis which is at right angles to a rolling direction of the copper alloy plate, and (2) the copper alloy plate has a work hardening exponent n ranging from not less than 0.13 to less than 0.6.

Figure 4C:
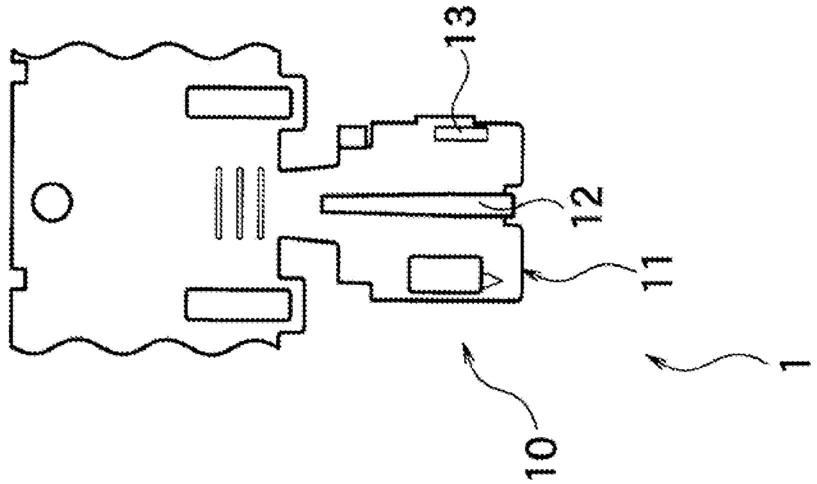
FIGS. 4A to 4C show explanatory drawings which depict a fabrication method of the female terminal 1.
Figure 4B:
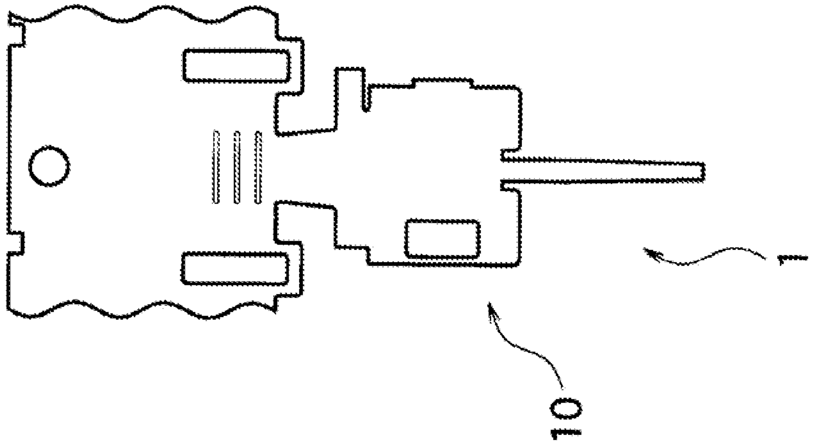
Figure 4A:
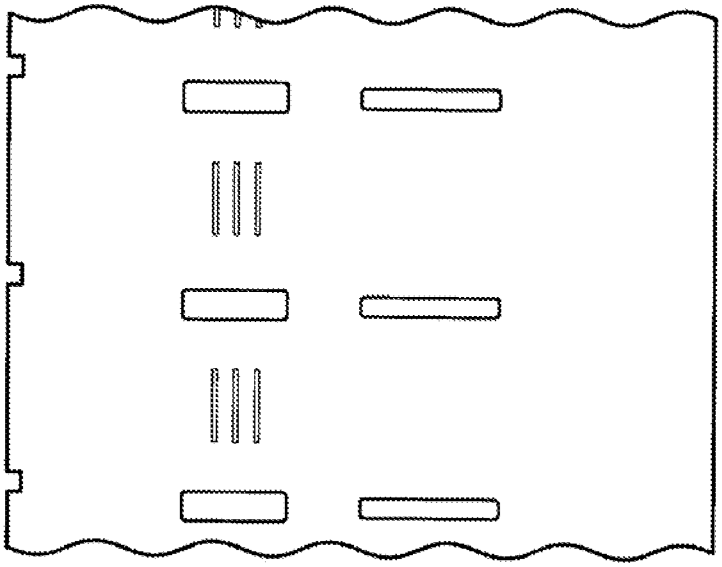
Figures 5A, 5B:
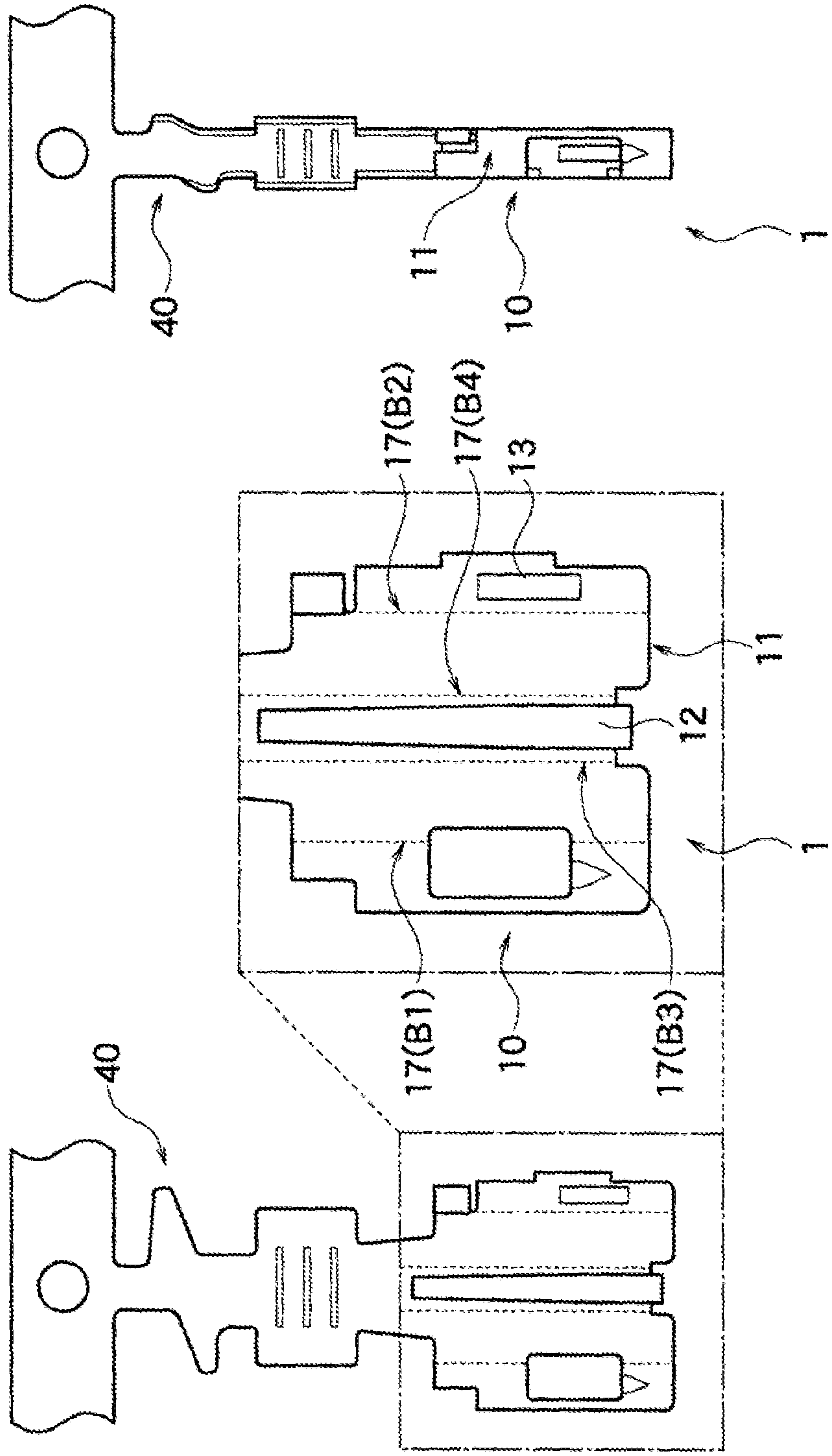
FIGS. 5A and 5B show explanatory drawings which depict the fabrication method of the female terminal 1.

In a second step, an external region (a blank of a box portion 11) of an electric contact portion 10 is formed by punching the copper alloy plate formed in the first step (refer to FIG. 4B). It should be noted that the first step and the second step do not necessarily have to be carried out separately. Thus, depending on shapes and working required, the punching operations described as being carried out in the first and second steps may be realized in a single step.

Ina third step, an elastic piece 12 and a contact portion 13 of the electric contact portion 10 are formed by bending the blank of the box portion 11 (refer to FIG. 4C).

In a fourth step, a notch 17 is formed into a line in each of four locations which correspond to inner sides of would-be bent portions B1 to B4 of the box portion 11 through notching. As this occurs, the width and depth of each notch 17 are set to fall in the corresponding ranges based on the thickness of the copper alloy plate. In this fourth step, a further punching operation is applied to the resulting copper alloy plate so as to form an external region of an electric wire connecting portion 40 (refer to FIG. 5A).

In a fifth step, the copper alloy plate formed through the series of punching and bending operations is bent. Specifically speaking, the would-be bent portions B1, B2 are bent individually through 90 degrees, and thereafter, the would-be bent portions B3, B4 are bent individually through 90 degrees (refer to FIG. 5B).

The female terminal 1 according to the embodiment which is shown in FIGS. 1 to 3 is formed through the series of steps.

EXAMPLE 1

A sample plate having a proof stress (σ0.2) of 706 MPa, a width of 10 mm and a thickness of 0.15 mm was prepared of a Corson series alloy containing 1.6 wt % Ni, 0.4 wt % Si, 0.6 wt % Sn, 0.4 wt % Zn and the remaining wt % of Cu and inevitable impurities which was obtained by being continuously and repeatedly bent with a tension leveler before an age heat treatment was applied thereto. Here, when the copper alloy plate was bent continuously and repeatedly, an entrance side tension of the tension leveler was controlled to be 50% of the proof stress (σ0.2) of the copper alloy plate, and an entrance side rolling reduction and an exit side rolling reduction of the tension leveler were controlled to be such a value that the shape of the copper alloy plate could be maintained properly.

This sample plate was bent 180 degrees about a bending axis which is at right angles to a rolling direction of the sample plate, and no crack was produced. The work hardening exponent n of the sample plate was 0.13.

In this sample plate, a notch having a width of about 95 μm (about ⅔ of the thickness of the sample plate) and a depth of 40 μm (about ¼ of the thickness of the sample plate) was formed along the bending axis which is at right angles to the rolling direction of the sample plate. Then, according to the JIS H 3110, the sample plate was disposed so that the notch is brought into contact with an apex portion (radius R=0) of a bending portion in a lower die of a bending jig, and a 90-degree W bending operation (corresponding to the bending condition of the female terminal) was applied to the sample plate so disposed. As a result of the bending, no crack was produced in the bent portion.

Thus, in this embodiment, the female terminal 1 has the box portion 11 which is formed into the quadrangular prism-like shape so as for a tab of a male terminal to fit therein by bending the Corson series copper alloy plate which is obtained by being continuously and repeatedly bent before an age heat treatment is applied thereto, which has the proof stress (σ0.2) of 700 MPa or larger and the width of 10 mm or larger and in which no crack is produced therein when bent 180 degrees about the bending axis which is at right angles to the rolling direction of the copper alloy plate. In this case, the box portion 11 includes the notches 17 which are formed in the inner sides of the bent portions B1 to B4 produced by bending the copper alloy plate, and the depth of the notches 17 is set to be in the range from ¼ to ½ of the thickness of the copper alloy plate.

According to the female terminal 1, the strength and formability of the neck portion and the box portion of the female terminal 1 can be increased by use of the copper alloy plate which is obtained by being continuously and repeatedly bent before an age heat treatment is applied thereto, which has the proof stress (σ0.2) of 700 MPa or larger and the width of 10 mm or larger and in which no crack is produced therein when bent 180 degrees about the bending axis which is at right angles to the rolling direction of the copper alloy plate. In addition, the occurrence of a work crack can be suppressed by the notches 17 which are formed in the bent portions B1 to B4. Additionally, the depth of the notches 17 is optimized, and therefore, the occurrence of a situation can be suppressed in which swellings are produced on the outer circumferences of the bent portions B1 to B4 in association with the bending of the copper alloy plate or the strength of the female terminal becomes insufficient due to a reduction in thickness of the copper alloy plate at the bent portions. By adopting this configuration, the female terminal 1 can be provided which is small in size and is superior in dimension stability after bending while having a high neck portion strength and a sufficiently high box portion strength. Because of this, the sectional shape of the box portion 11 comes close to a rectangular shape and the sectional area becomes smaller, thereby making it possible to realize an increase in easiness with which the terminal is inserted into the housing. In addition, an insertion space for the terminal in the housing can be set smaller, thereby making it possible to reduce the external dimensions of the connector.

In this embodiment, the copper alloy plate which is worked into the female terminal 1 is made of the Corson series copper alloy whose work hardening exponent n is in the range of not less than 0.13 to not less than 0.6. According to this configuration, the strength of the copper alloy plate is increased after the same plate has been worked due to work hardening, and therefore, the deterioration in bendability due to the formation of the notches 17 can be suppressed while successfully increasing the strength of the copper alloy plate to a higher level.

In this embodiment, the notch 17 has the trapezoidal sectional shape, and the width of the short side of the trapezoidal section is set to be in the range from ⅓ to ⅔ of the thickness of the copper alloy plate. According to this configuration, the reduction in strength of the box portion 11 can be suppressed while ensuring the bendability thereof.

Comparison Example 1

Here, a table below shows the results of experiments carried out as a comparison example with respect to the female terminal 1 according to the embodiment in which notches 17 were formed in a copper alloy plate (a Cu alloy plate containing 1.8 wt % Ni, 0.5 wt % Si, 0.5 wt % Sn and 1.0 wt % Zn which was not continuously and repeatedly bent before an age heat treatment was applied thereto, which had a proof stress (σ0.2) of 685 MPa, in which a crack was produced when bent 180 degrees and which had a work hardening exponent=0.027) which does not meet the requirements of the embodiment under various conditions (in relation to the depth and width of the notch 17) before the same copper alloy plate was bent and the Corson series alloy plate was bent through 90 degrees. Here, thickness of the cupper alloy plate is 0.15 mm.

TABLE 2

| | Notch Width | | | |
|---|---|---|---|---|
| Notch Depth | Plate Thickness × 1/10 | Plate Thickness × ⅓ | Plate Thickness × ½ | Plate Thickness × ⅔ |
| Plate Thickness × ⅕ | X | X | X | X |
| Plate Thickness × ⅓ | X | X | X | X |
| Plate Thickness × ½ | X | X | X | X |

It is seen from Table 2 that even when the notches were formed under the same conditions as those shown in Table 1 so as to form the box portion, Comparison Example 1 is inferior in formability.

Comparison Example 2

A sample plate was prepared which was the same as the sample plate of Example 1 except that the sample plate of Comparison Example 2 was not continuously and repeatedly bent with a tension leveler before an age heat treatment was applied thereto and that the proof stress (σ0.2) of the sample plate was 721 MPa.

When this sample plate was bent 180 degrees about a bending axis which is at right angles to a rolling direction of the sample plate, a crack was produced. In addition, the work hardening exponent n was 0.13.

In this sample plate, notches were formed under the same conditions as those of Example 1, and a 90-degree W bending operation was carried out on the sample plate, as a result of which cracks were produced in the bent portions.

In this embodiment, the female terminal 1 is fabricated by the fabrication method comprising the first step of punching the copper alloy plate which is obtained by being continuously and repeatedly bent before an age heat treatment is applied thereto, which has a proof stress (σ0.2) of 700 MPa or larger and a width of 10 mm or larger and in which no crack is produced therein when bent 180 degrees about the bending axis which is at right angles to the rolling direction of the copper alloy plate so as to form the blank which corresponds to the box portion 11 into which a tab of a male terminal is fitted and the second step of bending the blank into the quadrangular prism-shaped box portion 11. Here, the second step has the step of forming the notches 17 in the blank before the blank is bent, and the notches 17 are formed to the depth ranging from ¼ to ½ of the thickness of the copper alloy plate in the positions corresponding to the inner sides of the bent portions B1 to B4 which are formed when the blank is bent.

According to the invention as described above, the female terminal can be provided which is small in size and is superior in dimension stability after bending while having the high neck portion strength and the sufficiently high box portion strength.

Thus, while the female terminal and the fabrication method therefor according to the embodiment have been described heretofore, needless to say, the invention is not limited to the embodiment but can be modified variously without departing from the spirit and scope of the invention.

REFERENCE SIGN LIST

1 female terminal
10 electric contact portion
11 box portion
12 elastic piece
13 contact portion
14 bottom wall
15*a* side wall
15*b* side wall
16*a* upper wall
16*b* upper wall
17 notch
40 electric wire connecting portion
41 bottom plate portion
42 clamping portion
B1 to B4 bent portion

What is claimed is:

1. A female terminal fabrication method comprising:

a first step of punching a copper alloy plate so as to form a blank which corresponds to a quadrangular prism-shaped box portion into which a tab of a male terminal is fitted, wherein the copper alloy plate is obtained by being continuously and repeatedly bent before an age heat treatment is applied thereto, wherein the copper alloy plate has a proof stress of 700 MPa or larger and a width of 10 mm or larger in which no crack is produced therein when bent 180 degrees about a bending axis which is at right angles to a rolling direction of the copper alloy plate; and a second step of bending the blank into the quadrangular prism-shaped box portion, wherein the second step has a step of forming notches in the blank before the blank is bent, and wherein the notches are formed to a depth ranging from ¼ to ½ of a thickness of the copper alloy plate in positions corresponding to inner sides of bent portions which are formed when the blank is bent.

2. The method of claim 1, wherein the notches are formed to a width ranging from ⅓ to ⅔ of the thickness of the copper alloy plate.

3. The method of claim 1, wherein the copper alloy plate obtained by being continuously and repeatedly bent comprises a step of bending the copper plate so as to obtain a rate of elongation of 0.1 to 1.5% while applying tension corresponding to 30 to 70% of the proof stress of the copper plate.

4. The method of claim 1, wherein forming notches in the blank comprises forming the notches into a trapezoidal shape.

* * * * *